US006944747B2

United States Patent
Nair et al.

(12) United States Patent
(10) Patent No.: US 6,944,747 B2
(45) Date of Patent: Sep. 13, 2005

(54) APPARATUS AND METHOD FOR MATRIX DATA PROCESSING

(75) Inventors: Gopalan N Nair, Phoenix, AZ (US); Gouri G. Nair, Phoenix, AZ (US)

(73) Assignee: GemTech Systems, LLC, Phoenix, AZ (US)

( * ) Notice: Subject to any disclaimer, the term of this patent is extended or adjusted under 35 U.S.C. 154(b) by 83 days.

(21) Appl. No.: 10/315,700

(22) Filed: Dec. 9, 2002

(65) Prior Publication Data

US 2004/0111587 A1 Jun. 10, 2004

(51) Int. Cl.[7] ............................................. G06F 17/16
(52) U.S. Cl. ............................ 712/35; 712/11; 712/16; 345/644
(58) Field of Search ............................ 712/2, 4, 7, 10, 712/13, 15, 16, 17, 18, 19, 20, 21, 22, 35; 345/644; 708/514, 520, 607

(56) References Cited

U.S. PATENT DOCUMENTS

| 4,507,741 A | | 3/1985 | White |
| 4,811,267 A | | 3/1989 | Ando et al. |
| 5,283,900 A | | 2/1994 | Frankel et al. |
| 5,513,366 A | * | 4/1996 | Agarwal et al. ............. 712/22 |
| 5,586,284 A | | 12/1996 | Bindloss et al. |
| 5,764,551 A | * | 6/1998 | McCorkle .................. 708/300 |
| 5,822,606 A | * | 10/1998 | Morton ........................ 712/16 |
| 5,924,062 A | | 7/1999 | Maung |
| 5,966,528 A | | 10/1999 | Wilkinson et al. |
| 5,983,257 A | | 11/1999 | Dulong et al. |
| 6,275,920 B1 | | 8/2001 | Abercrombie et al. |
| 6,282,634 B1 | | 8/2001 | Hinds et al. |
| 6,332,186 B1 | | 12/2001 | Elwood et al. |
| 6,338,130 B1 | | 1/2002 | Sinibaldi et al. |

OTHER PUBLICATIONS

Mano, M. Morris and Kime, Charles R.; Logic and Computer Design Fundamentals; 2001; Prentice Hall, Inc.; 2nd Edition Updated; pp. 360–368.*
Hamacher, V. Carl, Vranesic, Zvonko G., and Zaky, Safwat G.; Computer Organization; 1984; McGraw–Hill, Inc.; 2nd Edition; pp. 19–21.*
The Authoritative Dictionary of IEEE Standards Terms; IEEE Press; 2000; 7th Edition; p. 577.*
InstantWeb Online Computing Dictionary; http://www.instantweb.com/d/dictionary/foldoc.cgi?query=co–processor; Jan. 5, 1995; "co–processor".*

* cited by examiner

Primary Examiner—William M. Treat
(74) Attorney, Agent, or Firm—Mark F. Wright; Wright Law Group, PLLC (57) ABSTRACT

A matrix data processor is implemented wherein data elements are stored in physical registers and mapped to logical registers. After being stored in the logical registers, the data elements are then treated as matrix elements. By using a series of variable matrix parameters to define the size and location of the various matrix source and destination elements, as well as the operation(s) to be performed on the matrices, the performance of digital signal processing operations can be significantly enhanced.

25 Claims, 5 Drawing Sheets

APPARATUS AND METHOD FOR MATRIX DATA PROCESSING

BACKGROUND OF THE INVENTION

1. Technical Field

The present invention relates generally to digital signal processing and more particularly to relatively high-speed signal processing for various applications, such as communications.

2. Background Art

Signal processing may be described as the mathematical manipulation of signals in a predetermined manner to enhance, modify or otherwise alter the signal, typically to prepare the signal for additional post-processing applications. The input signals are often "sampled" data elements taken from various forms of analog signals such as voice, video, and various communication sources. After sampling, these analog signals may be processed by a variety of electronic systems to accomplish the desired results. Additionally, input signals may be originally presented as digital signals and many signal-processing environments provide signal processing capabilities for analog as well as digital signals.

Approximately 30 years ago, with certain advances in technology, digital signal processing applications started to proliferate. This momentum was fueled, in part, by the rapid growth of digital electronics, including the emergence of semiconductor-based transistors and microprocessors. Prior to the advent of relatively inexpensive digital signal processing hardware, signal processing was mostly accomplished with analog components, implemented as a series of filters such as high pass filters, low pass filters, band pass filters and the like. Presently, digital signal processing is used extensively in applications such as cellular telephones, video capture and enhancement, high-speed data modems and the like.

While many modern microprocessors used in typical digital signal processing applications today can handle data elements with a relatively large number of representative bits (e.g., 32, 64, and 128 bits), most of the sampled analog signals processed by these microprocessors have a much smaller representative data resolution (e.g., 4, 8 or 16 bits). This disparity in the size of the data representations results in wasted processor bandwidth and other processing inefficiencies. For example, if 8 bit data elements are loaded into 16-bit or 32-bit registers, the remaining register bits may remain unutilized. This inefficient use of available storage results in resource underutilization, which generally leads to increased signal processing times. In general, this inefficient processing can lead to "data-starvation" for the microprocessor, and the microprocessor consumes precious cycle time and energy waiting for data to arrive instead of processing data.

Accordingly, in an attempt to take advantage of the capabilities offered by the processors available in the industry today, various techniques such as "packed data types" have been implemented to improve data utilization in the field of digital signal processing. This involves storing multiple data elements in a single register. For example, a single 32-bit register might be loaded with four 8-bit data elements. This technique, while successfully utilizing the available storage space, requires relatively complex indexing algorithms to effect data retrieval and manipulation. Additionally, the data elements are often still retrieved from the 32-bit register as discrete 8-bit elements, requiring multiple machine cycles to retrieve the data for processing.

Alternatively and/or in addition to more efficient data storage techniques, some digital signal processing systems have increased the speed of the data bus in an attempt to provide the smaller data elements to the microprocessor at higher frequencies, thereby speeding the overall processor operations. However, even after implementing these various techniques, the microprocessors used in many digital signal-processing systems remain "data-starved" and underutilized. This situation is undesirable because the lack of timely data presentation can, in certain circumstances, add additional processing cycles and, correspondingly, slow down the overall operation of the devices utilizing the processed signal.

As shown by the discussion presented herein, the current constraints on data utilization in the area of digital signal processing have prevented additional improvements in the rapidly accelerating pace of various signal-processing applications. Accordingly, unless further improvements and enhancements are made in the apparatus and methods used in storing and manipulating data elements, the capabilities of digital signal processing systems will remain sub-optimal.

BRIEF SUMMARY OF THE INVENTION

A matrix data processor is implemented wherein data elements are stored in physical registers and mapped to logical registers. The matrix data processor includes an arithmetic logic unit and a reaister set. The register set includes a configuration register and the configuration register contains one or more matrix parameters that are configured to describe and identify a first source matrix, a second source matrix, and at a destination matrix. After being stored in the logical registers, the data elements are then treated as matrix elements. By using the matrix parameters to define the size and location of the various matrix source and destination elements, as well as the operation(s) to be performed on the matrices, the performance of digital signal processing operations can be significantly enhanced.

BRIEF DESCRIPTION OF DRAWINGS

The preferred embodiments of the present invention will hereinafter be described in conjunction with the appended drawings, wherein like designations denote like elements, and.

DETAILED DESCRIPTION OF THE PREFERRED EMBODIMENTS

The matrix data processor of the present invention stores data elements in physical registers and maps the data elements to logical registers. The matrix data processor then performs data processing operations by treating the data elements in the logical registers as elements of matrices. By using a series of variables to define the size and location of the matrix elements, as well as the operation(s) to be performed on the matrix elements, the performance of digital signal processing operations can be significantly enhanced.

Figure 1:
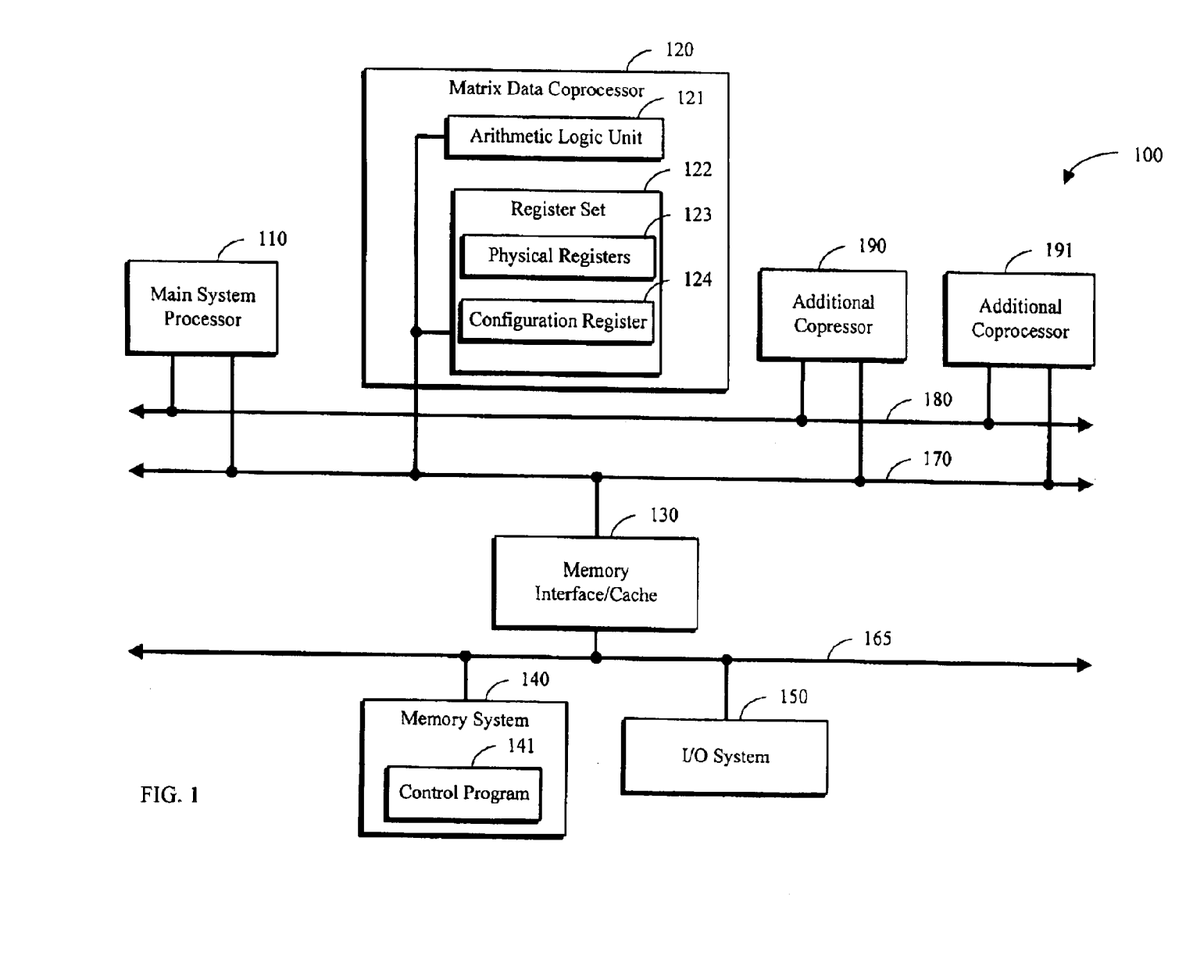
FIG. 1 is a block diagram of a matrix data processing system in accordance with a preferred exemplary embodiment of the present invention.

Referring now to FIG. 1, a matrix data processing system 100 in accordance with a preferred embodiment of the present invention comprises a main system microprocessor 110, a matrix data processor 120, one or more optional coprocessors 190 and 191, a memory interface/cache 130, a memory system 140, and an I/O system 150. Main system processor 110, coprocessors 120, 190 and 191, and memory interface/cache 130 are coupled via a bus 170. Bus 170 provides a pathway for passing various types of information, such as data and instructions, between the various connected components.

Main system processor 110 and coprocessors 120, 190 and 191 are also coupled together by coprocessor bus 180. Coprocessor bus 180 communicates commands and various control signals between main system processor 110 and coprocessors 120, 190 and 191. Instructions fetched from memory system 140 are visible to main system processor 110 and coprocessors 120, 190, and 191. These instructions provide the necessary data and information for coprocessors 120, 190 and 191 to complete their assigned tasks. It should be noted that while matrix data processing system 100 incorporates two coprocessors, i.e., 190 and 191, matrix data processing system 100 may include any suitable number of coprocessors, depending on the specific application requirements. Similarly, memory interface cache 130 and memory system 140 and I/O system 150 are coupled together via memory bus 165. Memory bus 165 provides for communication between memory interface cache 130 and memory system 140 and I/O system 150.

Main system microprocessor 110 may be any microprocessor suitable for use in a signal-processing environment. For example, the most preferred embodiments of the present invention may advantageously utilize an Advanced RISC Machines (ARM) processor offered by ARM Ltd. to perform the functions of main system microprocessor 110. Depending on the engineering and production specification for a given application, other microprocessors known to those skilled in the art may also be used and the present invention may be implemented using a wide variety of processors. The ARM architecture is depicted herein merely because the use of the ARM architecture incorporates a well-known coprocessor deployment methodology that is well understood by those skilled in the art.

Regardless of the specific processor chosen, main system processor 110 typically comprises an instruction sequencer and fetch unit that performs all operations related to fetching instructions from the appropriate memory location. Additionally, the functions of main system processor 110 will preferably include both address generation and the handling of the instruction bus.

In the most preferred embodiments of the present invention, matrix data processor 120 is a special function microprocessor designed specifically for digital signal processing applications. Additionally, matrix data processor 120 houses a plurality of registers that are used in storing and processing data. Additional detail about the functional operation of matrix data processor 120 is presented in conjunction with the discussion of FIGS. 2–7. It should be noted that in the co-processor configuration, such as that depicted in FIG. 1, activities such as memory management, data caching, instruction decoding, processing of general purpose instructions, etc. are performed by microprocessor 110. In some alternative preferred embodiments of the present invention, matrix data processor 120 is implemented as a stand-alone processor and the operational functions currently provided by processor 110, such as memory management, data caching, instruction decoding, etc. would be incorporated into the stand-alone processor.

While shown as discrete components, those skilled in the art will recognize that microprocessor 110 and matrix co-processor 120 may be physically combined onto a single chip. Additionally, in at least one preferred embodiment of the present invention, the functionality of both microprocessor 110 and matrix data co-processor 120 may be performed by a single microprocessor. The exemplary embodiment shown in FIG. 1 is intended to demonstrate the addition of matrix data processing capabilities to existing signal processing applications. Eventually, it will be possible to include the functions of matrix data co-processor into other architectures.

The various buses shown in FIG. 1 are provided to pass data and instructions between the various system components depicted in FIG. 1 and other components that are not included in FIG. 1. For example, after processing various data supplied from external memory system 140, matrix data processor 120 can output the results for transmission via data bus 180. In this fashion, post-processing activities may be implemented by other post-processing components. The data path or width of the various buses will be determined by the specific application. However, with the exception of co-processor bus 180, the buses are depicted generally as 32-bit buses. Co-processor bus 180 is represented as a 3-bit bus.

Additionally, while each of busses 165, 170, and 180 are shown as a single bus, various preferred embodiments may actually use multiple separate busses to accomplish the communication between the various components of matrix data processing system 100. Finally, it should be understood that, depending on the specific architecture and application requirements, the number and types of busses in a given matrix data processing system 100 may vary. The various buses shown in FIG. 1 are merely representative of any suitable communication link or communication mechanism, including a hardwired connection, an internal or external bus, including infrared or other wireless communications that can suitably perform the functions described herein.

Memory system 140 suitably contains at least some form of data to be processed and all or part of the object code for the control program used to control matrix data processing system 100. The control program is configured to receive an instruction and construct the first source matrix and the second source matrix. Additionally, the control program is configured to instruct the arithmetic logic unit (ALU) to perform at least one matrix operation using the first and second source matrices as operands. The term "memory" as used herein refers to any storage location in the virtual memory space of matrix data processing system 100. It should be understood that memory system 140 may or may not be implemented as a monolithic memory structure. For example, portions of the control program may be loaded into an instruction cache (not shown) for processor 110 to execute, while other files may well be stored on direct access storage devices (DASD) such as magnetic or optical disk storage devices (not shown). In addition, it is to be understood that external memory system 140 may consist of multiple disparate memory locations.

I/O system 150 provides is representative of an interface to additional system components and the physical connections therefore. These additional system components may include video displays, DASD components, speakers, keyboards, printers and the like. By utilizing I/O system 150, data processed by matrix data processing system 100 may be communicated to other devices and systems, allowing for various post-processing options such as display or transmission of the processed data. Additionally, I/O system 150 may be used to provide data by to matrix data processing system 150 by utilizing external acquisition devices for sampling and importing analog data.

In operation, main system processor 110 manages the fetching and interpretation of the instructions stored in memory system 140. As required, main system processor 110 will communicate with memory interface 130 and request the appropriate instructions/data form memory system 140. These instructions and data are transmitted from memory system 140 to main system processor 110 via bus 170. Main system processor 110, coprocessors 120, 190, and 191 can each retrieve the information presented on bus 170 and will validate the instructions/data and interpret the instructions, executing any valid instructions as appropriate.

If a given instruction is intended for execution by main system processor 110, main system processor 110 will execute the instruction. In this specific exemplary embodiment of the present invention, the instructions for coprocessors 120, 190 and 191 are embedded within the main instruction stream. Accordingly, main system processor 110 will recognize those instructions that are intended for execution by coprocessors 120, 190 and 191. If, however, a given instruction is intended for execution by one of coprocessor 120, 190 or 191, main system processor 110 will signal the appropriate coprocessor.

In the case of instructions intended for matrix data coprocessor 120, matrix data coprocessor 120 will authenticate the instruction and respond to main system processor 110 when the instruction has been received and recognized. At the appropriate time, matrix data coprocessor will interpret and execute the instruction or instructions and then signal main system processor 110 that the instruction has been successfully executed. It should be noted that this is just one example of a typical "handshaking" process that is well known to those skilled in the art. Other handshake protocols may also be employed, as appropriate.

It should be noted that various modifications, additions, or deletions may be made to matrix data processing system 100 illustrated in FIG. 1 within the scope of the present invention such as the addition of other peripheral devices, including various direct access storage devices (DASD) such as hard disk drives and the like.

Figure 2:
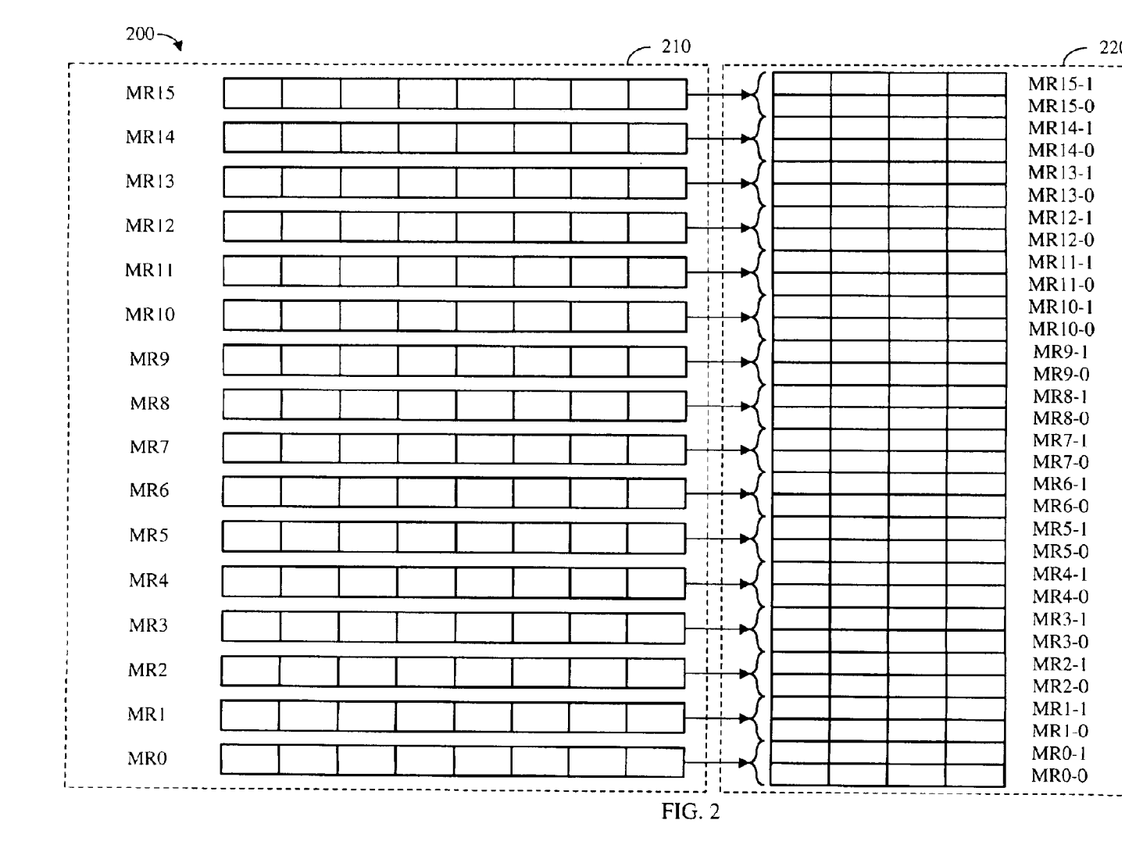
FIG. 2 is a block diagram of a register set in a matrix data processor in accordance with a preferred exemplary embodiment of the present invention.

Referring now to FIG. 2, a register set 200 for matrix data processor 120 of FIG. 1 comprises a logical register set 210 and a physical register set 220. In the most preferred embodiments of the present invention, logical register set 210 comprises a series of 16 registers, with each register in logical register set 210 comprising a 64-bit register. Correspondingly, in the most preferred embodiments of the present invention, physical register set 220 comprises a series of 32 registers, with each register in physical register set 220 comprising a 32-bit register. With this configuration, each 64-bit register in logical register set 210 is mapped to and represented by two 32-bit registers in physical register set 220. Logical register set 210 and a physical register set 220 are coupled to each other via an internal communication link.

Although specific sizes and numbers of registers have been identified herein for purposes of illustration, those skilled in the art will recognize that other sizes of registers may be incorporated and any suitable number of logical and physical registers may be incorporated into a matrix data processing system. The examples presented in FIG. 2 are merely illustrative of one specific configuration adapted for a specific application.

It should be noted that the most preferred embodiments of logical register set 210 include a status register and a control register, in addition to 14 general-purpose registers. Correspondingly, physical register set 220 comprises 2 status registers, 2 control registers, and 28 general-purpose registers. This configuration allows each logical 64-bit data element from logical register set 210 to be stored in two 32-bit locations in physical register set 220. Memory access, including loading and storing data elements, is controlled by microprocessor 110, shown in FIG. 1. In the most preferred embodiments of the present invention, various data elements are typically stored as packed data sets in physical register set 220 and then mapped to logical register set 210. Once mapped to logical register set 210, the various elements may be manipulated as matrix elements.

Matrix data processor 120 operates with matrices as the basic data type, with each of the elements of the matrix being identified from the packed data types contained in register set 200. Matrix data types can be any two-dimensional matrices of any size, limited only by the span of the register set 200. Accordingly, each element or component of each matrix may be any one of the following:

4-bit signed or unsigned number (nibble or N)
8-bit signed or unsigned number (byte or B)
16-bit signed or unsigned number (half-word or H)
32-bit signed or unsigned number (word or W)
64-bit signed or unsigned number (double-word or D)

The data elements are typically identified in the packed matrix data processor registers by using their indices, starting from an initial value of zero for the first element. The data elements are identified by their index in the 'packed data space. By using the indices as described in conjunction with FIGS. 4 and 5, data elements in register set 200 may be accessed as any of N, B, H, W or D data types. This flexibility in the creation of the individual matrix elements provides a relatively high amount of flexibility in the construction of matrices and, correspondingly, in the type of signal processing calculations that can be performed.

In the most preferred embodiments of the present invention, the packing of the data in register set 200 is always aligned to a power of 2, starting from bit 0 of each of the 64 bit registers. Accordingly, each of the 64 registers can contain 16, 8, 4, 2, or 1 of N, B, H, W or D data elements respectively. The packing is preferably done in such a manner so that none of the data elements would span the register boundaries. Other embodiments may use alternative data packing schemes and methodologies, depending on the specific requirements of a given application.

In traditional digital signal processors and other generic microprocessors, the operands are typically stored in registers or uniquely addressable memory locations. Even in the MMX architectures and the vector architectures used in relatively high performance computing, the operands are still registers or memory locations, or a contiguous set of registers or memory. The matrix data processor of the present invention introduces a novel methodology for handling data, by treating it as a data set that could be configured as matrices and vectors of a very flexible but mathematically structured format.

In the most preferred embodiments of the present invention, matrix data processor 120 utilizes a load/store architecture, in the sense that all the data processing (arithmetic and logical) operations are performed on the data elements stored in register set 200. There are separate instructions for transferring data between memory system 140 and register set 200. Similarly, there is a separate set of instruction for transferring data between the memory registers of main system processor 110 and register set 200. Even when performing the loading and storing operations to accomplish data exchange between register set 200 and memory system 140, the source and target information in matrix data processor 120 is structured as matrices, thus providing more flexibility to manipulate (e.g. pack/unpack complex numbers, etc.) of different data types.

In the most preferred embodiments of the present invention, matrix data processor 120 has at least three operand operations, similar in structure to a standard ARM instruction, with source matrix "$M_y$" operating on source matrix "$M_x$", with the result stored in destination matrix "$M_d$". Source matrices $M_x$ and $M_y$ are formed by an ordered arrangement of the packed data residing in register set 200. It should be noted that the matrix data elements are logical configurations for presenting a specific data structure to the arithmetic logic unit (ALU), (contained within matrix data processor 120), and may not necessarily have any other physical relationship or significance in the context of computations performed by matrix data processor 120. Destination matrix $M_d$ is a designation for the matrix elements located in register set 200 where the results of the computations performed by the arithmetic logic unit (ALU) contained in matrix data processor 120 may be stored.

In general microprocessor architectures and implementations, it is preferable to have each instruction remain as independent as possible from the earlier instructions, and as independent as possible from the current state (saved in the register file, status register, or otherwise) of the machine. One implication of this is a desire to be able to specify all of the operands required for processing any given instruction within the instruction stream proper, without having to resort to passing the information regarding instructions through multiple instructions. In the case of the present invention, this implies that the definitions of each of the three matrix operands (two sources and one destination) will be provided for each matrix operation as a part of the instruction stream for the specified matrix operation in order to deploy an optimal solution.

To be able to span a register file of sixteen 64 bit registers, with data elements packed as nibbles (4 bits), the indexing mechanism should most preferably have at least 8 bits available to reference any given location in the packed data set. In addition, the matrix reference should be able to describe and provide the matrix order (numbers of rows and columns) and also the intervals to be used between the rows and columns to logically construct the operand matrices.

Figure 4:
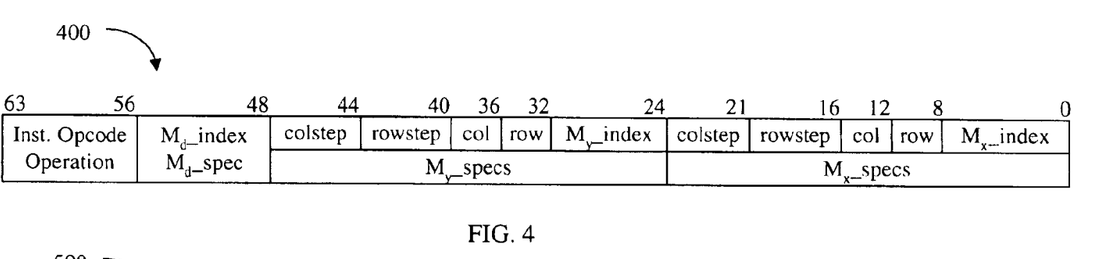
FIG. 4 is a block diagram of an 64-bit instruction for specifying a series of matrices for a matrix data processor in accordance with a preferred exemplary embodiment of the present invention.

Referring now to FIG. 4, one possible solution for specifying the matrix operation and the complete description for each of the matrix parameters used to identify and construct the matrices is shown. Each of the variable matrix parameters for identifying the elements of the respective matrices (i.e., number of rows and columns, element resolution) can be given sufficient resolution to cover the range of the operands that should be represented. It should be noted that the results or destination matrix $M_d$ does not require the same level of specification as the source matrices because the matrix order, element intervals and/or steps are implied as a result of the matrix operation performed using matrices $M_x$ and $M_y$. As shown in FIG. 4, providing the full specification in a single instruction can be achieved using an instruction word of 64 bits or more.

As the number of bits in the instruction become more limited, it becomes increasingly difficult to specify all desired matrix parameters to adequately identify the source and destination matrices. In fact, when the instruction word length available to matrix data processor 120 is limited to less than 32 bits, it becomes very difficult, if not impossible, to provide the full specifications directly in the instructions. In the example embodiment, the available bits for each of the instruction mapping as a coprocessor is only 19 bits in each instruction word, as the remaining 13 bits of the normal 32 bit ARM processor instruction word is utilized for other purposes. In most applications, this space is insufficient to fully specify the variable matrix parameters that comprise the matrices in the instruction itself. The most preferred embodiments of the present invention resolve this problem by:

Separating the matrix parameters in two separate groups based on the frequency of possible changes by the user;

Using a configuration register to store the less frequently changed parameters;

Using fewer bits of the instructions to specify the operand matrices; and

Generating the complete matrix description as a mathematical and logical combination of the information stored in the configuration register and the instruction, thereby generating the operand matrices to present to the matrix date processor's ALU.

Separate instructions (to individually load as groups) to handle the data for the configuration registers.

It should also be noted that the specific configuration bits shown in the exemplary embodiments have been selected for illustrative purposes only and many other arrangements for storing the necessary information in the configuration register are possible. Additionally, the various flags shown are not specifically used in matrix identification but generally to further quantify the specific type of mathematical operations to be performed on the matrix elements once identified.

Figure 3:
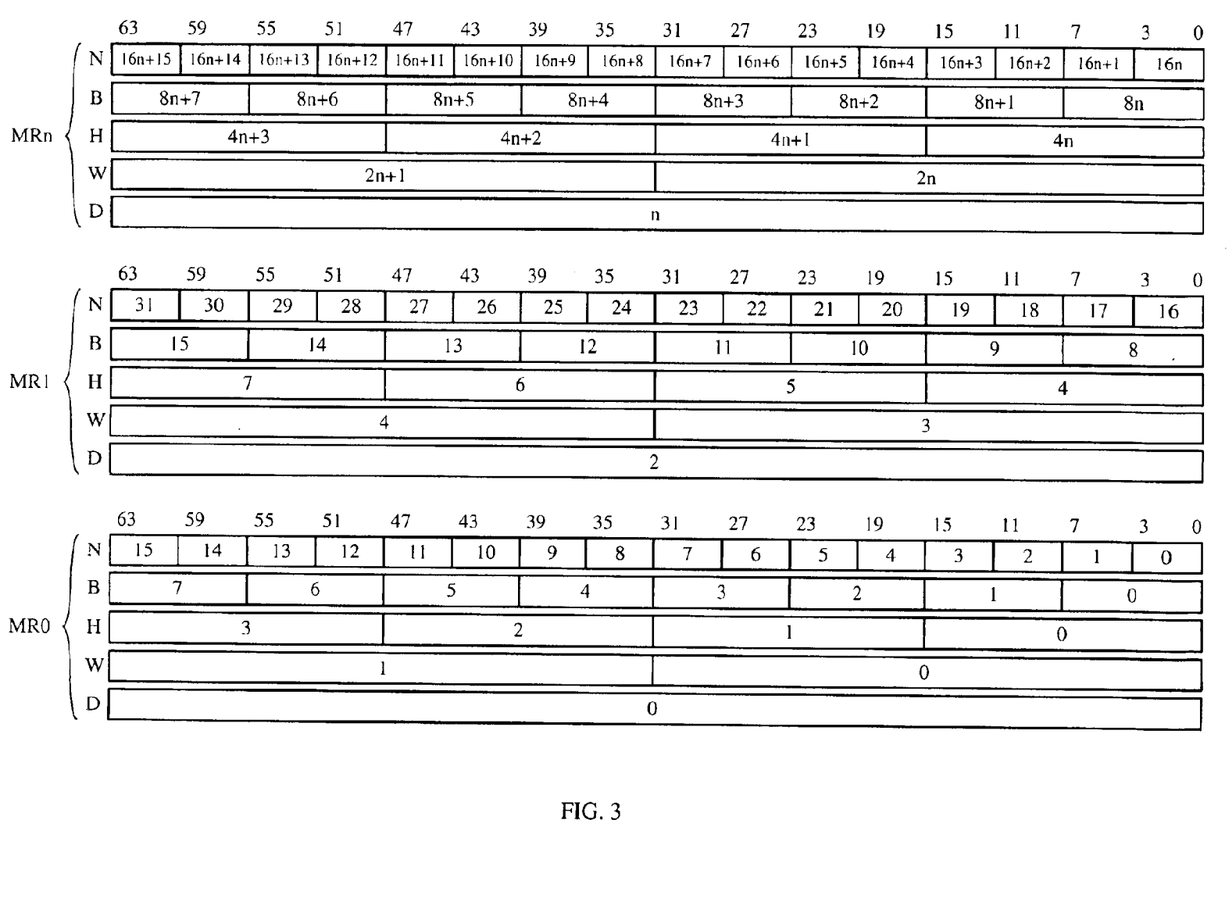
FIG. 3 is a block diagram of a register set in a matrix data processor in accordance with a preferred exemplary embodiment of the present invention.

Referring now to FIG. 3, an indexing methodology 300 for use with a matrix data processor in accordance with a preferred exemplary embodiment of the present invention is shown. It should be noted that while indexing methodology 300 is shown as implementing a "little endian" indexing methodology, those skilled in the art will recognize that a corresponding "big endian" indexing methodology may be similarly employed.

A special group of instructions (LCW0 to LCW6) are provided to load the desired parameters to the configuration register, without disturbing the remaining values. The LCW0 instruction also permits simultaneous loading of all the matrix identification and configuration parameters in the configuration register (except S and F) to a desired initial default value. Alternately, the user has the option to move all 64 bits of the configuration register from an external memory location to the configuration register, using a memory load instruction.

In addition to the operand parameters specified in the configuration register, three bits each are typically assigned in each of the instructions to identify the $M_x$, $M_y$ and $M_d$ matrices, by their starting element indices. For purposes of illustration, these are termed $M_x\_offset$, $M_y\_offset$ and $M_d\_offset$, each with a parametric range of 0 to 7. Matrix data processor 120 then calculates the index of $M_x$ and $M_y$ as:

$$M_x\_index = M_x\_base + (offset\_scale)(M_x\_offset)$$

$$M_y\_index = M_y\_base + (offset\_scale)(M_y\_offset)$$

$$M_d\_index = M_d\_base + (offset\_scale)(M_d\_offset)$$

The use of an offset_scale parameter for the $M_x\_index$, $M_y\_index$ and $M_d\_index$ computation permits a wider range of indices for the starting elements for each of the matrices. Additionally, it should be noted that the use of three bits to identify the starting or base element indices is merely illustrative and those skilled in the art will recognize other possible methods to accomplish the same task (i.e., using more bits to encompass a larger range).

Referring now to FIG. 4, a sample of a 64-bit instruction 400 for use in conjunction with a matrix data processor in accordance with a preferred embodiment of the present invention is shown. As shown in FIG. 4, instruction 400 contains a complete specification for identifying and executing a matrix operation using source matrix $M_x$ and a source matrix $M_y$ as its operands. The results of the matrix operation are stored in destination matrix $M_d$. Bits 56–63 are used to specify the instruction opcode, describing the specific matrix operation to be performed. Bits 48–55 specify the information necessary for storing the results of the specified matrix operation in destination matrix $M_d$. Similarly, bits 24–47 specify the information necessary for identifying the elements that are used to create source matrix $M_y$ and bits 0–23 specify the information necessary for identifying the elements that are used to create source matrix $M_x$.

In this exemplary embodiment, instruction 400 is essentially a "stand-alone" instruction that contains all necessary information for identifying the various source and destination matrices as well as the command specifying what matrix operation should be performed using the defined matrices. While this is the most preferred method for performing matrix operations from a theoretical standpoint, in practical application it requires the use of a relatively large instruction that may not be available in all cases. Accordingly, this may have a tendency to limit the backward compatibility of the invention with other, pre-existing architectures, including many digital signal-processing systems. Accordingly, an alternative preferred embodiment for identifying the desired matrix operation and the various source and destination matrices is to use a control register as described in conjunction with FIGS. 5 and 6.

Figure 5:
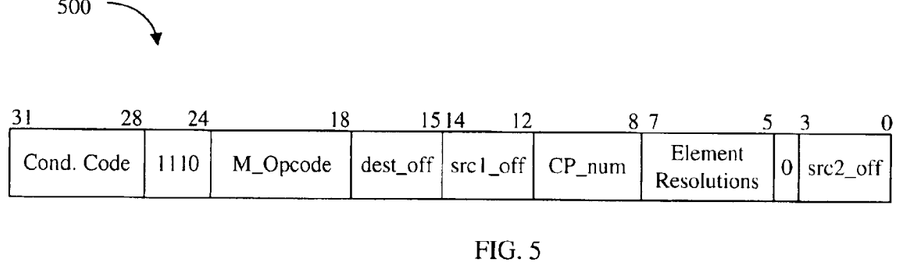
FIG. 5 is a block diagram of a 32-bit instruction for specifying a series of matrices for a matrix data processor and a control register in accordance with a preferred exemplary embodiment of the present invention.

Referring now to FIG. 5, a sample instruction 500 for a system using a general-purpose microprocessor and a matrix data co-processor in accordance with a preferred exemplary embodiment of the present invention is depicted. As shown in FIG. 5, sample instruction 500 is a 32-bit instruction. It should be noted that since this example assumes a co-processor implementation, with a general-purpose microprocessor using a 32-bit instruction. Accordingly, sample instruction 500 is formatted in accordance with the standard format for a typical ARM microprocessor. Other instruction formats may be adopted to achieve similar results with other microprocessor architectures. Additionally, it should be noted that the specific bit assignments are illustrative only and the identification of the matrix elements may be accomplished with alternative bit assignments.

When matrix data processor 120 is implemented as a coprocessor, coupled with a processor such as a 32-bit ARM V4 microprocessor, it is desirable to adhere to the standard instruction formats used by the microprocessor. While the full instruction set of the ARM microprocessor is available to complement the instructions used by matrix data processor 120 to operate on the dataset, the restrictions imposed by the ARM instruction mapping may make the specification of the individual matrix operands a bit cumbersome. Accordingly, certain indexing strategies may be advantageously employed to overcome any inherent limitations or deficiencies in the ARM instruction format.

In the typical ARM instruction set architecture, only 19 bits are available out of the 32 bits for the coprocessor data processing instructions. These 19 bits include the bits to be allocated for the opcodes of matrix data processor 120 (5 to 6 bits) as well as that for the desired matrix definition parameters. For full identification of each of the source matrices, matrix data processor 120 should most preferably be provided with the matrix size, indices for the respective matrix elements (i.e., $M_x\_index$ and $M_y\_index$), and a manner of identifying the locations of the successive elements from the selected index. It should be noted that while the present example assumes a starting index, the matrices may be identified by indicating some other element of the matrices, such as the last element and then indexing into the matrices from the last element. The available 14 bits of the standard instruction map are generally insufficient to fully specify the three matrices (source1, source2, and destination), while still maintaining the flexibility that is desired in the data manipulation process.

In processors with relatively large instruction data widths, this may not be a problem. However, in the case of applications where matrix data processor 120 is employed as a coprocessor, the issue of efficient and effective specification of the matrix elements may be advantageously resolved by allocating one of the 16 registers in matrix data processor 120 for configuration purposes. Such a configuration register is shown and explained in conjunction with FIG. 6. With a configuration register, at least a portion of the matrix element identification information is contained in the instruction and at least another portion of the matrix element identification information is contained in the configuration register. This approach allows certain preferred embodiments of matrix data processor 120 to be used in conjunction with general-purpose microprocessors that utilize less than a 64-bit instruction.

Figure 6:
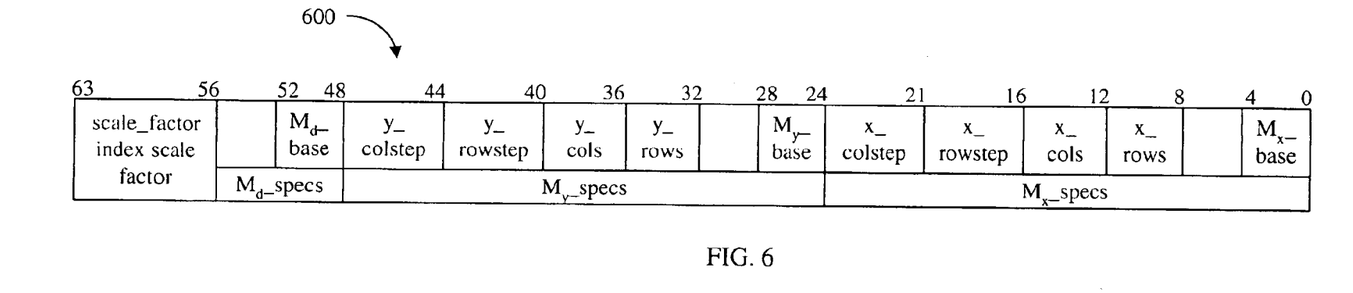
FIG. 6 is a block diagram of a configuration register for a matrix data processor in accordance with a preferred exemplary embodiment of the present invention.

Referring now to FIG. 6, a sample bit assignment for a matrix configuration register or control register 600 in accordance with a preferred exemplary embodiment of the present invention is depicted. By utilizing control register 600, certain matrix identifying elements can be stored in control register 600, thereby removing them from the instruction stream. Control register 600 most preferably contains that information is modified less frequently. This specific implementation uses a combination of the information contained in control register 600 and the information contained in a typical 32-bit instruction to identify the matrix operation and the elements that comprise the source and destination matrices. By adopting this methodology, the present invention can be deployed in conjunction with most existing general-purpose microprocessors.

As shown in FIG. 6, control register 600 is most preferably a 64-bit register. Those skilled in the art will recognize that similar results could be accomplished with two 32-bit registers and other, similar register configurations.

Given the data contained in control register 600 and the information in a given instruction, the source matrices may be identified and formed using the following parameters:

The resolution of the elements for each of the matrices is provided as part of the instruction opcode. This information allows parsing of the register set to identify the elements of the matrices with their indices.

The order of each of the matrices, x_rows, x_cols, y_rows and y_cols. These are row and column parameters.

The index for the starting element of each of the matrices, $M_x$_index and $M_y$_index. These are provided as a combination of parameters provided in the control register 600 and the specific instruction.

The interval between corresponding elements of the successive rows of the matrices and the intervals between corresponding elements of successive columns. This parameter is stored in control register 600.

The formation and structure for storing the results of the matrix operation in the destination matrix are slightly different, due to the fact that the size and configuration of the destination matrix are not typically subject to independent control, other than the specification of element resolution and the starting index. Thus, for the destination matrix:

The number of rows and columns are typically determined by the specific operation that produces the destination matrix, in accordance with standard matrix arithmetic calculations Element resolution of the destination matrix data is most preferably specified in the instruction mnemonic It should be noted at this point that the parameters for row and column interval have little meaning since the matrix is already formed, as a result of the matrix operation performed by matrix data processor 120. Accordingly, the results need only to be saved at the referenced location for the destination matrix as specified in the configuration register.

Column unrolling is most preferably used for storing the result matrix to a set of packed register locations. Other methods of data packing and unpacking known to those skilled in the art may also be used in other embodiments. For column unrolling, the successive column elements are stored in successive packed data locations (cells) in the register, beginning with the index of the starting element. As in the case of the two source matrices, the destination start element is also identified as a parametric combination of information supplied through configuration register 500 and/or through the instruction parameters supplied in the instruction received from main system processor 110. Thus during destination matrix storage, assuming a methodology employing the starting element for each matrix, the implied assumptions are:

The starting index is calculated from parameters, and the first element (1,1) is placed at this location;

The elements of the first column are placed in successive locations in register;

The elements of $2^{nd}$ and following columns are placed in successive locations, until all the data are written;

This implies that if matrix $M_d$ were to be recreated for a subsequent matrix operation, using $M_d$ serving as a source register, the parameters for the corresponding source register would most preferably be:

Number of rows and columns as that of $M_d$, to be estimated and used as parameter;

Starting index as specified for $M_d$;

Interval between rows=1, as the matrix is stored by column unrolling;

Successive elements of the matrix are stored in successive locations. Interval between column elements=number of rows.

Examples of specific matrix arithmetic operations are shown in Table 1 below. For this example, there are nine different arithmetic operations, represented by mnemonics, each of which is capable of supporting either signed or unsigned arithmetic, resulting in a total of 18 arithmetic instruction mnemonics. The unsigned operation has an extension of 'U' to the instruction mnemonic; the default operation without the 'U' modifier is signed. In some situations, the results of the various arithmetic operations may be accumulated in the destination matrix by adding the results of the operation to the existing values previously stored in the destination matrix.

In addition to the illustrative arithmetic operations described in Table 1, basic bit-wise logical operations including bit shifting, logical AND/NAND/OR/NOR/XOR and similar logical operations known to those skilled in the art may also be performed on the various matrix elements. In this embodiment, the logical operations are generally performed on corresponding elements of the two source matrices and the results will typically be stored in the destination matrix. In some cases, e.g. a bit-wise complement operation, there may actually be only two operand matrices with the results from the operation on a source matrix being stored in a destination matrix. Samples of the various types of logical operations used in conjunction with a preferred embodiment of the present invention are depicted in Table 2 below. It should be noted that the sample arithmetic and logical operations depicted in Tables 1 and 2 are merely illustrative of the types of operations that may be performed and are not to be considered exhaustive.

In general, for the most preferred embodiments of the present invention, a three-bit field positioned in the instruction provides instruction modifiers for the resolutions of the elements for both the source and the destination matrices. The various preferred embodiments of the present invention implementation may or may not support different resolutions for the two different source matrices, depending on the specific application. The resolution modifiers are specified in the instruction mnemonic, following the conditional execution statement based on a typical ARM instruction format. The first and second resolution modifiers successively represent the destination and source matrices.

TABLE 1

| Mnemonic | Operation | Action |
|---|---|---|
| MMUL | Matrix Multiply | $\{d_{i,j}\} \Leftarrow \left\{\sum_n y_{i,n} * x_{n,j}\right\}$ |
| MMULR | Matrix Multiply-Reverse | $\{d_{i,j}\} \Leftarrow \left\{\sum_n x_{i,n} * y_{n,j}\right\}$ |
| MMAC | Matrix Multiply-accumulate | $\{d_{i,j}\} \Leftarrow \left\{d_{i,j} + \sum_n y_{i,n} * x_{n,j}\right\}$ |
| MMACR | Matrix Multiply-accumulate Reverse | $\{d_{i,j}\} \Leftarrow \left\{d_{i,j} + \sum_n x_{i,n} * y_{n,j}\right\}$ |
| MADD | Matrix Addition | $\{d_{i,j}\} \Leftarrow \{y_{i,j} + x_{i,j}\}$ |
| MSUB | Matrix Subtraction | $\{d_{i,j}\} \Leftarrow \{y_{i,j} - x_{i,j}\}$ |

TABLE 1-continued

| Mnemonic | Operation | Action |
|---|---|---|
| MSUBR | Matrix Subtraction – Reverse | $\{d_{i,j}\} \Leftarrow \{x_{i,j} - y_{i,j}\}$ |
| MMLE | Element by element Multiply | $\{d_{i,j}\} \Leftarrow \{y_{i,j} * x_{i,j}\}$ |
| MMCE | Element by element Multiply – Accumulate | $\{d_{i,j}\} \Leftarrow \{d_{i,j} + y_{i,j} * x_{i,j}\}$ |

TABLE 2

| Mnemonic | Operation | Action |
|---|---|---|
| MSHRA | Shift Right – Arithmetic | $\{d_{i,j}\} \Leftarrow \{y_{i,j} >> x_{i,j}\}$ |
| MSHRAR | Shift Right – Arithmetic – Reverse | $\{d_{i,j}\} \Leftarrow \{x_{i,j} >> y_{i,j}\}$ |
| MSHR | Shift Right – Logical | $\{d_{i,j}\} \Leftarrow \{y_{i,j} >> x_{i,j}\}$ |
| MSHRR | Shift Right – Logical – Reverse | $\{d_{i,j}\} \Leftarrow \{x_{i,j} >> y_{i,j}\}$ |
| MSHL | Shift Left – Logical | $\{d_{i,j}\} \Leftarrow \{y_{i,j} << x_{i,j}\}$ |
| MSHLR | Shift Left – Logical Reverse | $\{d_{i,j}\} \Leftarrow \{x_{i,j} << y_{i,j}\}$ |
| MAND | Matrix Logical AND | $\{d_{i,j}\} \Leftarrow \{y_{i,j} <\text{and}> x_{i,j}\}$ |
| MANDN | Matrix Logical NAND | $\{d_{i,j}\} \Leftarrow \{y_{i,j} <\text{nand}> x_{i,j}\}$ |
| MOR | Matrix Logical OR | $\{d_{i,j}\} \Leftarrow \{y_{i,j} <\text{or}> x_{i,j}\}$ |
| MXOR | Matrix Logical Exclusive OR | $\{d_{i,j}\} \Leftarrow \{y_{i,j} <\text{xor}> x_{i,j}\}$ |
| MNOTX | Matrix Logical complement | $\{d_{i,j}\} \Leftarrow \{<\text{NOT}> x_{i,j}\}$ |
| MNOTY | Matrix Logical complement | $\{d_{i,j}\} \Leftarrow \{<\text{NOT}> y_{i,j}\}$ |

Figure 7:
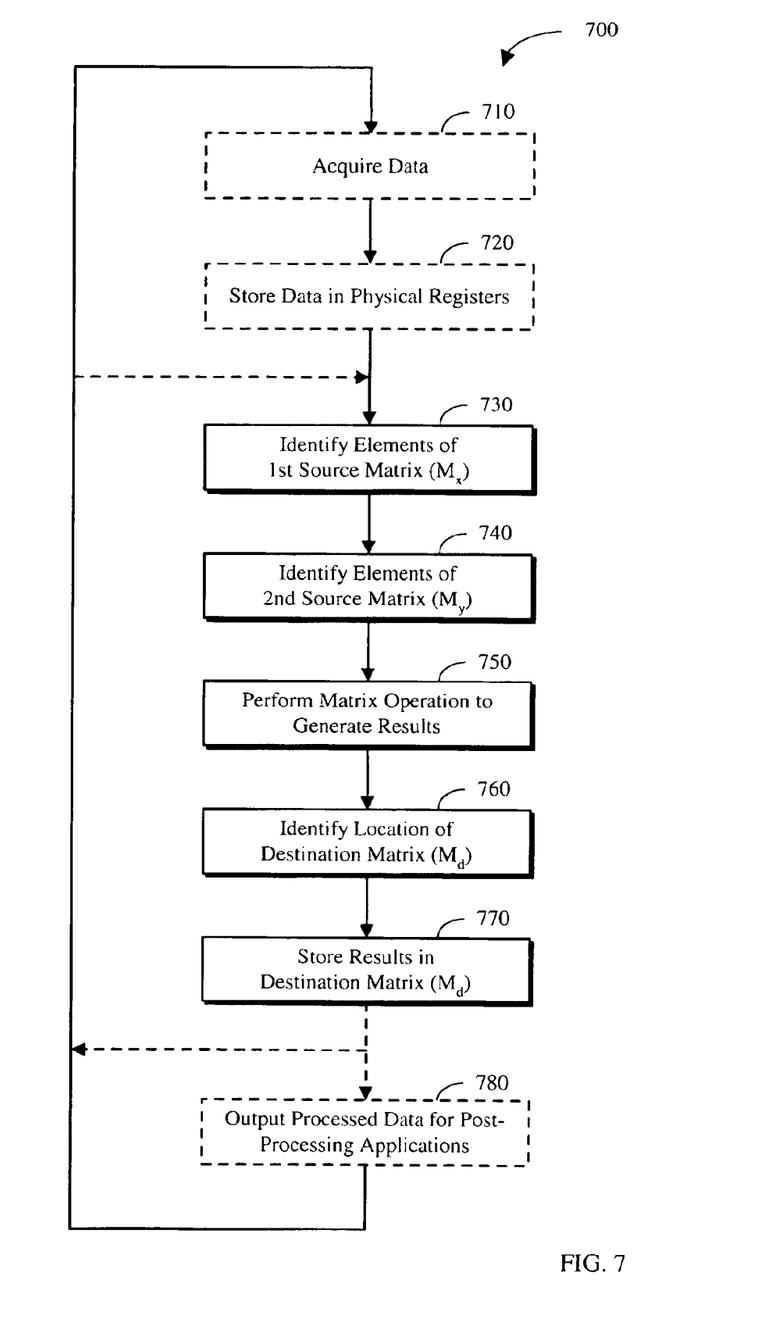
FIG. 7 is a flow chart of a matrix data processing method in accordance with a preferred exemplary embodiment of the present invention.

Referring now to FIG. 7, a matrix data processing method 700 in accordance with a preferred exemplary embodiment of the present invention is shown. Method 700 may begin with a data acquisition step (step 710) to acquire the data for processing. If necessary or desired, data may be acquired from multiple sources as part of performing step 710. Further, any analog data acquired in step 710 may be converted to digital data if necessary and this conversion process is considered part of step 710. The specific process employed for converting analog data to digital data is not described herein and any suitable methodology known to those skilled in the art may be adopted.

Next, the acquired data is stored in physical registers that are associated with the matrix data processing co-processor and associated with the desired logical register set as defined for the matrix data processing co-processor (step 720). It should be noted that steps 710 and 720 are considered optional steps and are performed only if new data is desired or necessary for a desired matrix data processing operation.

After the data has been acquired and stored in the appropriate registers, the elements that comprise the first source matrix can be identified for processing (step 730). This step typically involves indexing into the physical register set and identifying a matrix with the appropriate parameters to designate the size of each matrix element, the number of rows in the matrix and the number of columns in the matrix. As previously described, in the most preferred embodiments of the present invention, at least a portion of the identifying information for the elements that comprise the source and destination matrices may be contained in the instruction stream provided by the microprocessor. In this specific embodiment, a combination of data from the instruction stream and from the configuration register is used to provide the necessary matrix identification parameters.

Alternatively, the identifying information for the elements, size, and location of the various matrices may be stored in a configuration register that is preloaded with the appropriate configurations for the desired operations. In yet another preferred embodiment of the present invention, the identifying information for the elements, size, and location of each matrix is completely and specifically identified solely by the information contained in the instruction. This implementation is appropriate for those processors with a large enough instruction space to adequately represent the requisite matrix identification information. Similarly, the second source matrix can be identified for processing (step 740).

After correctly identifying the source matrices, the desired matrix operation(s) can be performed (step 750). It should be noted that any type of matrix operation known to those skilled in the art may be performed using the source matrices. This includes addition, subtraction, multiplication, etc. Additionally, it should also be noted that the present invention also contemplates the use of pre-determined standard matrices such as an identity matrix, transpose matrix, "F," matrix, etc. as one of the source matrices, thereby providing the capability to quickly perform most standard elementary matrix operations. These standard matrices may be permanently located in the memory space of the system or loaded from an external memory source as needed. Additionally, it should be noted that the source and destination matrices may overlap, with some data being stored in one location but being referenced more than once. This provides for additional flexibility in performing matrix operations and also conserves physical storage space by eliminating redundant data storage.

After performing the matrix operation, the location of destination matrix $M_d$ can be determined by using the identifying information contained in the instruction word and the configuration register (step 760). Once the appropriate storage location has been identified, the results from the matrix operation can be stored in the destination matrix $M_d$ (step 770).

As shown by the arrows in FIG. 7, the matrix data processing method of the present invention provides an opportunity for repetitive acquisition and processing of data prior to the eventual step of outputting the processed data for post-processing use (step 780). It should be noted that post-processing is a desired activity but may not be necessary after every matrix operation as the initial results stored in a given destination matrix may be an intermediate processing step and, accordingly, may become the source matrix for a subsequent operation.

Those skilled in the art will recognize that the matrix data processing environment of the present invention is unique in several aspects. Significantly, the matrix data processing system of the present invention identifies computational operands as matrices, with matrix elements packed in the register set of the processor. The specific matrix elements are identified and operated on as matrix elements, not as scalar elements. However, this does not foreclose the use of scalar elements since scalar elements can be readily implemented as a special case of matrix operations.

Additionally, in the most preferred embodiments of the present invention, the identifying information for the source and destination matrices are contained in the instruction stream or, alternatively, in a configuration register that is preloaded with the appropriate configurations. This feature allows for infinite variations in the size of the matrices (i.e., size of matrix rows and columns).

From the foregoing description, it should be appreciated that apparatus and methods for a matrix data processor are provided and present significant benefits that would be apparent to one skilled in the art. Furthermore, while multiple embodiments have been presented in the foregoing description, it should be appreciated that a vast number of variations in the embodiments exist. For example, while illustrated as a stand-alone ARM-based co-processor, it will be understood by those skilled in the art that the functions and operational characteristics of the matrix data processor may be suitably incorporated into a CPU core, such as the ARM series of CPUs offered by ARM Ltd. Additionally, those skilled in the art will recognize that many other microprocessor architectures and models may be suitably deployed to practice the matrix data processing functions described herein.

Lastly, it should be appreciated that the illustrated embodiments are preferred exemplary embodiments only, and are not intended to limit the scope, applicability, or configuration of the invention in any way. Rather, the foregoing detailed description provides those skilled in the art with a convenient road map for implementing a preferred exemplary embodiment of the invention. Accordingly, it should be understood that various changes may be made in the function and arrangement of elements described in the exemplary preferred embodiments without departing from the spirit and scope of the invention as set forth in the appended claims.

What is claimed is:

1. A matrix data processor comprising:
   an arithmetic logic unit;
   a register set coupled to said arithmetic logic unit, said register set comprising:
      a physical register set; and
      a configuration reaister, said conflagration resister comprising a plurality of matrix configuration parameters;
   a memory coupled to said arithmetic logic unit and to said register set; and
   a control program residing in said memory, said control program being configured to receive an instruction and construct a first logical two-dimensional source matrix with the number of matrix rows and columns both being greater than 1 and a second logical two-dimensional source matrix with the number of matrix rows and columns both being greater than 1 using said instruction and said plurality of matrix configuration parameters, said control program being configured to instruct said arithmetic logic unit to perform at least one matrix operation using said first and second logical two-dimensional source matrices as operands.

2. The matrix data processor of claim 1 wherein a general purpose microprocessor is coupled to said matrix data processor and said memory wherein said matrix data processor is a co-processor.

3. The matrix data processor of claim 1 wherein said register set comprises at least one configuration register, said at least one configuration register being configured to store at least one matrix parameter used to identify and define said first and second source matrices.

4. The matrix data processor of claim 1 wherein said matrix operation is an arithmetic operation.

5. The matrix data processor of claim 1 wherein said matrix operation is a logical operation.

6. The matrix data processor of claim 4 wherein said arithmetic operation is one of a matrix addition operation, a matrix subtraction operation, a matrix multiplication operation, and a matrix division operation.

7. The matrix data processor of claim 5 wherein said logical operation is one of a logical AND operation, a logical NAND operation, a logical OR operation, and a logical XOR operation.

8. The matrix data processor of claim 1 wherein said control program is configured to store a result from said matrix operation in at least one destination matrix.

9. The matrix data processor of claim 1 wherein at least one of said first and second source matrices is one of an identity matrix, a transpose matrix, and an "F" matrix.

10. The matrix data processor of claim 1 wherein said register set comprises at least one configuration register and wherein said configuration register is configured to store a plurality of matrix parameters, said matrix parameters being used in conjunction with said instruction to identify and define said first and second source matrices.

11. The matrix data processor of claim 1 wherein at least one of said first and second source matrices also comprises a destination matrix.

12. A signal-processing system, said signal processing system comprising:
   a general purpose microprocessor;
   a matrix data processor coupled to said general purpose microprocessor, said matrix data processor comprising:
      an arithmetic logic unit; and
      a register set, said register set comprising a configuration register, said configuration register containing a plurality of matrix parameters for at least partially describing and identifying a first logical source matrix, with the number of matrix rows and columns both being greater than 1, a second logical source matrix, with the number of matrix rows and columns both being greater than 1, and at least one destination matrix;
   a memory coupled to said general purpose microprocessor and said matrix data processor; and
   a control program residing in said memory, said control program being configured to respond to an instruction and use said instruction and said plurality of matrix parameters in said configuration register to construct said first logical source matrix and said second logical source matrix and instruct said arithmetic logic unit to perform at least one matrix operation using said first logical source matrix and said second logical source matrix as operands, and wherein said control program is configured to store a result from said matrix operation in said at least one destination matrix.

13. The matrix data processor of claim 12 further comprising an input/output system coupled to said general purpose microprocessor.

14. The matrix data processor of claim 12 further comprising a co-processor coupled to said general purpose microprocessor.

15. A computer-implemented method of processing data in an electronic signal-processing environment said method comprising the steps of:
   loading a register set contained within a computer memory with data;
   receiving at least one instruction from a microprocessor, said at least one instruction comprising a plurality of matrix parameters, said at least one instruction defining at least one matrix operation;
   parsing said data and said plurality of matrix parameters to construct a first logical matrix with the number of matrix rows and columns both being greater than 1;
   parsing said data and said plurality of matrix parameters to construct a second logical matrix;
   performing said at least one matrix operation using said first logical matrix and said second logical matrix, with the number of matrix rows and columns both being greater than 1, thereby generating a result; and
   strong said result in said computer memory.

16. The method of claim 15 further comprising the step of storing said result in a destination matrix.

17. The method of claim 16 wherein step of storing said result in a destination matrix comprises the step of storing said result in one of said first and second logical matrices.

18. The method of claim 15 wherein said step of performing said matrix operation using said first logical matrix and said second logical matrix comprises the step of performing at least one of a matrix addition operation, a matrix subtraction operation, a matrix multiplication operation, and a matrix division operation.

19. The method of claim 15 wherein said step of loading a register set with data comprises the step of loading a register set with packed data.

20. The method of claim 19 wherein said step of loading a register set with packed data comprises one of the steps of:
   a) loading said register set with a plurality of 4-bit data elements;
   b) loading said register set with a plurality of 8-bit data elements;
   c) loading said register set with a plurality of 16-bit data elements;
   d) loading said register set with a plurality of 32-bit data elements; and
   e) loading said register set with a plurality of 64-bit data elements.

21. The method of claim 15 wherein said step of parsing said data and said plurality of matrix parameters to construct a first logical matrix and said step of parsing said data and said plurality of matrix parameters to construct a second logical matrix comprise the steps of:
   identifying at least one element resolution parameter;
   identifying at least one base element index;
   identifying at least one row parameter and at least one column parameter;
   identifying at least one condition code;
   identifying at least one opcode; and
   identifying a plurality of index offsets.

22. The method of claim 16 wherein said step of loading a register set with data further comprises the step of loading a configuration register, said configuration register being configured to at least partially describe and define said first logical matrix, said second logical matrix and said destination matrix.

23. The method of claim 15 wherein said step of receiving at least one instruction comprises the step of receiving a plurality of instructions from a general purpose processor, said plurality of instructions being designated for execution by a co-processor.

24. A computer-implemented method of matrix data processing, said method comprising the steps of:
   parsing an instruction contained within a computer memory to identify a matrix operation;
   parsing said instruction to identify a first plurality of matrix parameters;
   parsing a control roister contained within said computer memory to identify a second plurality of matrix parameters;
   using said first and second plurality of matrix parameters to construct a first logical source matrix with the number of matrix rows and columns both being greater than 1, a second logical source matrix with the number of matrix rows and columns both being greater than 1, and at least one destination matrix;
   performing said matrix operation using said first and second logical source matrices; and
   storing a result from said matrix operation in said at least one destination matrix.

25. The method of claim 24 wherein said first and second plurality of matrix parameters comprise at least one base index parameter, an index scale factor, at least one offset parameter, a row description parameter, a column description parameter, and an element resolution parameter.

* * * * *